United States Patent
Rösel et al.

(10) Patent No.: US 9,551,263 B2
(45) Date of Patent: Jan. 24, 2017

(54) METHOD AND DEVICE FOR OPERATING AN INTERNAL COMBUSTION ENGINE

(75) Inventors: Gerd Rösel, Regensburg (DE); Norbert Sieber, Obermichelbach (DE)

(73) Assignee: CONTINENTAL AUTOMOTIVE GMBH, Hanover (DE)

(*) Notice: Subject to any disclaimer, the term of this patent is extended or adjusted under 35 U.S.C. 154(b) by 728 days.

(21) Appl. No.: 12/864,506

(22) PCT Filed: Nov. 10, 2008

(86) PCT No.: PCT/EP2008/065228
§ 371 (c)(1),
(2), (4) Date: Sep. 15, 2010

(87) PCT Pub. No.: WO2009/092465
PCT Pub. Date: Jul. 30, 2009

(65) Prior Publication Data
US 2010/0326053 A1 Dec. 30, 2010

(30) Foreign Application Priority Data
Jan. 24, 2008 (DE) .................... 10 2008 005 882 U

(51) Int. Cl.
*F01N 3/00* (2006.01)
*F01N 9/00* (2006.01)
(Continued)

(52) U.S. Cl.
CPC ......... *F01N 11/007* (2013.01); *F02D 41/0295* (2013.01); *F02D 41/2458* (2013.01);
(Continued)

(58) Field of Classification Search
CPC F01N 11/007; F01N 2570/16; F01N 2250/12; F01N 2430/06; F02D 41/0295; F02D 41/2458; F02D 2200/0816; B01D 2255/908; Y02T 10/47
(Continued)

(56) References Cited

U.S. PATENT DOCUMENTS 4,099,377 A * 7/1978 Yoshimura et al. ............ 60/276
5,050,551 A * 9/1991 Morikawa ..................... 123/305
(Continued)

FOREIGN PATENT DOCUMENTS

DE 10225682 1/2003 ............. F01N 11/00
DE 10240977 3/2004 ............. F01N 11/00
(Continued)

OTHER PUBLICATIONS

International Search Report and Written Opinion for Application No. PCT/EP2008/065228 (19 pages), Feb. 16, 2009.
(Continued)

*Primary Examiner* — Thomas Denion
*Assistant Examiner* — Brandon Lee
(74) *Attorney, Agent, or Firm* — Slayden Grubert Beard PLLC

(57) ABSTRACT

An internal combustion engine with multiple cylinders and injection valves that are provided for the cylinders and that meter fuel also comprises an exhaust gas tract in which an exhaust gas catalytic converter is arranged. A characteristic value (OSC) of an oxygen storage capacity of the exhaust gas catalytic converter is determined. In accordance with the characteristic value (OSC), a heating measure (HM) for heating the exhaust gas catalytic converter is carried out.

16 Claims, 2 Drawing Sheets

(51) Int. Cl.
*F01N 11/00* (2006.01)
*F02D 41/02* (2006.01)
*F02D 41/24* (2006.01)

(52) U.S. Cl.
CPC .... *B01D 2255/908* (2013.01); *F01N 2250/12* (2013.01); *F01N 2430/06* (2013.01); *F01N 2570/16* (2013.01); *F02D 2200/0816* (2013.01); *Y02T 10/47* (2013.01)

(58) Field of Classification Search
USPC .................................. 60/277, 284, 285, 286
See application file for complete search history.

(56) References Cited

U.S. PATENT DOCUMENTS

| | | | |
|---|---|---|---|
| 5,092,123 A * | 3/1992 | Nada et al. | 60/274 |
| 5,357,754 A * | 10/1994 | Ogawa et al. | 60/276 |
| 5,678,402 A * | 10/1997 | Kitagawa et al. | 60/276 |
| 5,822,979 A * | 10/1998 | Hamburg et al. | 60/274 |
| 5,974,788 A * | 11/1999 | Hepburn et al. | 60/274 |
| 6,481,200 B1 * | 11/2002 | Hirota et al. | 60/284 |
| 6,494,037 B2 | 12/2002 | Oguma et al. | 60/285 |
| 6,993,899 B2 | 2/2006 | Lewis et al. | 60/285 |
| 7,007,461 B2 | 3/2006 | Lewis et al. | 60/285 |
| 2002/0139110 A1 * | 10/2002 | Brown | 60/284 |
| 2004/0244364 A1 * | 12/2004 | Makki et al. | 60/285 |
| 2005/0193722 A1 | 9/2005 | Fujiwara et al. | 60/285 |
| 2005/0229588 A1 * | 10/2005 | Lewis et al. | 60/285 |
| 2006/0207240 A1 * | 9/2006 | Araki et al. | 60/284 |
| 2007/0271905 A1 * | 11/2007 | Muraguchi | F01N 3/0842 60/284 |

FOREIGN PATENT DOCUMENTS

| | | | |
|---|---|---|---|
| DE | 10246505 A1 | 4/2004 | F01N 9/00 |
| DE | 102005033060 | 1/2007 | F01N 9/00 |
| DE | 102006014249 | 10/2007 | F01N 3/20 |
| EP | 1130239 | 9/2001 | F02D 41/02 |
| JP | 9310636 | 12/1997 | F02D 41/14 |

OTHER PUBLICATIONS

International PCT Preliminary Report on Patentability, PCT/EP2008/065228, 9 pages, Nov. 10, 2008.
German Office Action, German Patent Application No. 10 2008 005 882.3-13, 2 pages, Aug. 1, 2008.

* cited by examiner

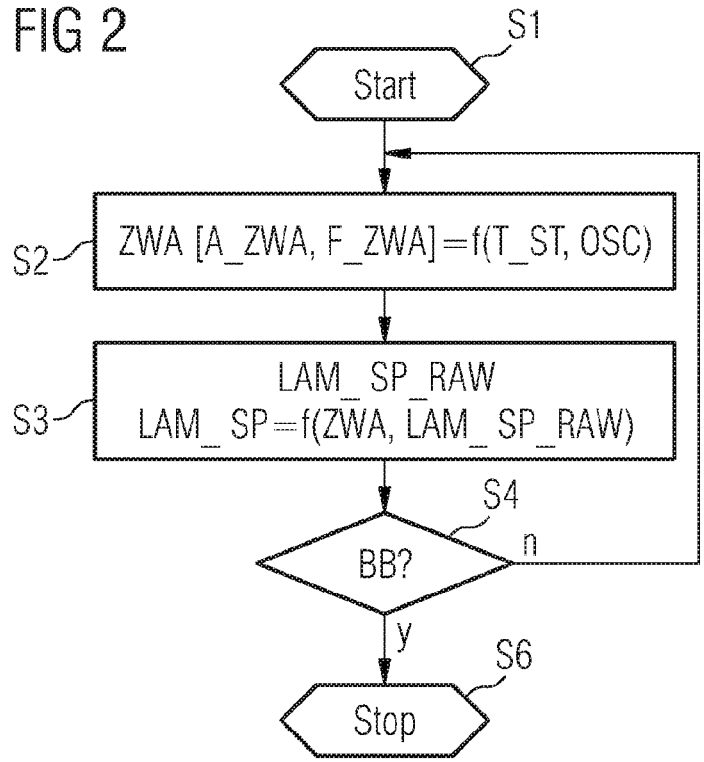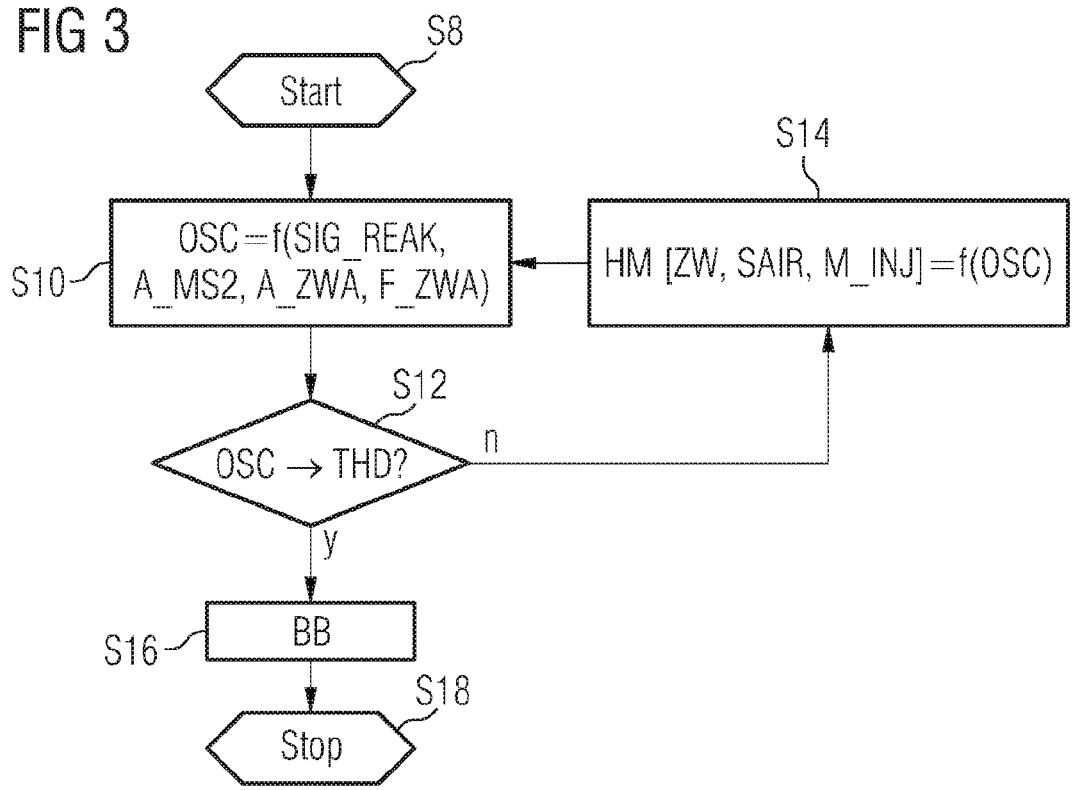

METHOD AND DEVICE FOR OPERATING AN INTERNAL COMBUSTION ENGINE

CROSS-REFERENCE TO RELATED APPLICATIONS

This application is a U.S. National Stage Application of International Application No. PCT/EP2008/065228 filed Nov. 10, 2008, which designates the United States of America, and claims priority to German Application No. 10 2008 005 882.3 filed Jan. 24, 2008, the contents of which are hereby incorporated by reference in their entirety.

TECHNICAL FIELD

The invention relates to a method and device for operating an internal combustion engine.

BACKGROUND

Increasingly stringent statutory regulations governing permissible polluting emissions in motor vehicles in which internal combustion engines are disposed make it necessary to limit the polluting emissions to an absolute minimum during the operation of an internal combustion engine. This can be accomplished on the one hand by a reduction in the polluting emissions that are produced during the combustion of the air/fuel mixture in the respective cylinder of the internal combustion engine. On the other hand exhaust gas aftertreatment systems are employed in internal combustion engines in order to convert the polluting emissions produced during the combustion process of the air/fuel mixture in the respective cylinder into harmless substances. In spark ignition engines in particular, three-way catalytic converters are used as exhaust gas catalyzers for this purpose, for example. A precisely adjusted air/fuel ratio in the cylinders is a prerequisite in order to achieve a high degree of efficiency in the conversion of polluting emissions such as e.g. carbon monoxide, hydrocarbons and nitrogen oxides. Furthermore the mixture upstream of the exhaust gas catalytic converter must also exhibit a predefined variation, that is, for example, alternating operation of the internal combustion engine in excess air mode and air deficiency mode, in order to effect a replenishment and depletion of the oxygen store of the exhaust gas catalytic converter. When oxygen is stored, the nitrogen oxides in particular are reduced, whereas when the store is emptied the oxidation process is assisted and in addition stored oxygen molecules are prevented from deactivating subsections of the exhaust gas catalytic converter.

A particularly relevant proportion of the polluting emissions normally occurs after the internal combustion engine is started and before the exhaust gas catalytic converter has reached a state of operational readiness. Heating measures which can include, for example, an injection of secondary air are known for bringing about the operational readiness of the exhaust gas catalytic converter in the swiftest possible manner.

SUMMARY

According to various embodiments, a method and a device can be created which enable the internal combustion engine to operate with low polluting emissions.

According to an embodiment, a method for operating an internal combustion engine having a plurality of cylinders and injection valves assigned to the cylinders for the purpose of metering fuel, and having an exhaust gas tract in which an exhaust gas catalytic converter is disposed, may comprise—determining a characteristic variable for an oxygen storage capacity of the exhaust gas catalytic converter, and—performing a heating measure for heating up the exhaust gas catalytic converter as a function of the characteristic variable.

According to a further embodiment, the characteristic variable for the oxygen storage capacity can be determined as a function of a measurement signal of an exhaust gas probe which is disposed in the exhaust gas catalytic converter or downstream of the exhaust gas catalytic converter in the exhaust gas tract. According to a further embodiment, a predetermined air/fuel ratio can be subjected to a forced stimulation during a time interval up to the establishing of an operational readiness of the exhaust gas catalytic converter. According to a further embodiment, the forced stimulation can be adjusted in terms of its amplitude as a function of a period of time that has elapsed since a starting of the internal combustion engine. According to a further embodiment, the amplitude can be increased as the period of time that has elapsed since the starting of the internal combustion engine increases. According to a further embodiment, the forced stimulation can be adjusted in terms of its amplitude as a function of the characteristic variable for the oxygen storage capacity. According to a further embodiment, the amplitude can be increased with values of the characteristic variable which represent an increasing oxygen storage capacity of the exhaust gas catalytic converter.

According to a further embodiment, the forced stimulation can be adjusted in terms of its frequency as a function of the period of time that has elapsed since a starting of the internal combustion engine. According to a further embodiment, the frequency of the forced stimulation can be reduced as the period of time that has elapsed since the starting of the internal combustion engine increases. According to a further embodiment, a frequency of the forced stimulation can be adjusted as a function of the characteristic variable for the oxygen storage capacity. According to a further embodiment, the frequency of the forced stimulation can be reduced with values of the characteristic variable which represent an increasing oxygen storage capacity of the exhaust gas catalytic converter. According to a further embodiment, the characteristic variable for the oxygen storage capacity can be determined as a function of a time interval during the individual period of the forced stimulation until a predetermined signal response of the measurement signal of the exhaust gas probe occurs. According to a further embodiment, the characteristic variable for the oxygen storage capacity can be determined as a function of an amplitude of the measurement signal of the exhaust gas probe. According to a further embodiment, the characteristic variable for the oxygen storage capacity can be determined as a function of an integral of the measurement signal of the exhaust gas probe relative to a predetermined measurement signal reference value.

According to another embodiment, a device for operating an internal combustion engine may have a plurality of cylinders and injection valves assigned to the cylinders for the purpose of metering fuel, and an exhaust gas tract in which an exhaust gas catalytic converter is disposed, wherein said device being embodied—to determine a characteristic variable for an oxygen storage capacity of the exhaust gas catalytic converter, and—to perform a heating measure for heating up the exhaust gas catalytic converter as a function of the characteristic variable.

BRIEF DESCRIPTION OF THE DRAWINGS

Exemplary embodiments are explained in more detail below with reference to the schematic drawings, in which:

FIG. 2 is a flowchart of a first program for operating the internal combustion engine, and FIG. 3 is a flowchart of a second program for operating the internal combustion engine.

Figure 1:
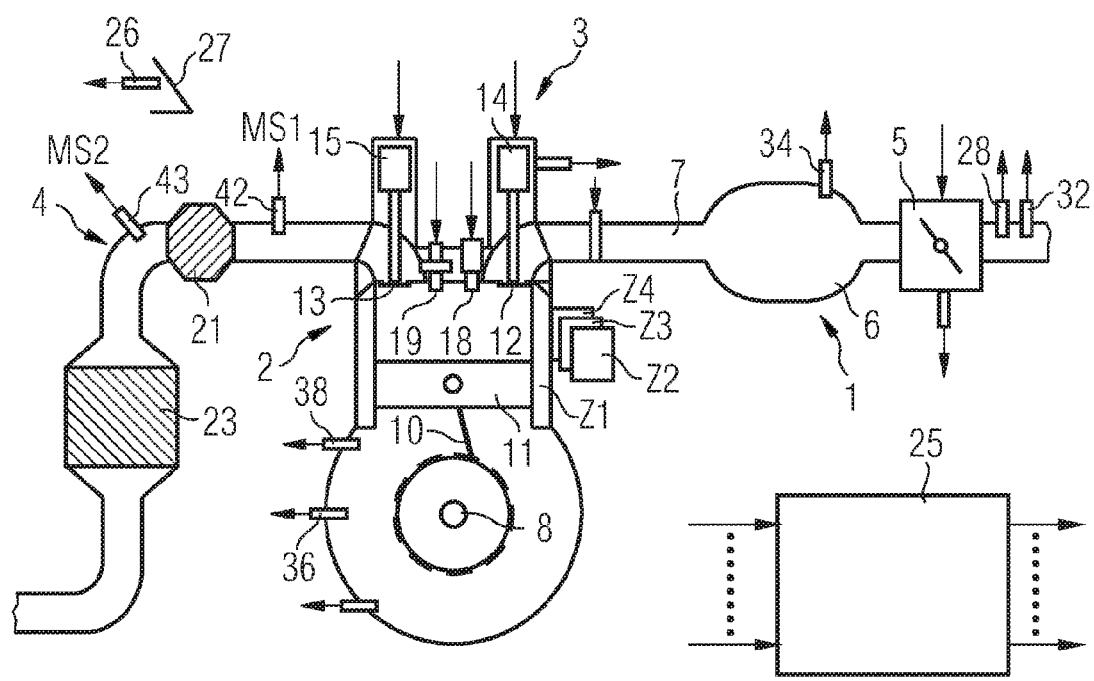
FIG. 1 shows an internal combustion engine having a control device.

Elements of like construction or function are labeled with the same reference signs through the figures.

DETAILED DESCRIPTION

According to various embodiments, a method and a corresponding device for operating an internal combustion engine has a plurality of cylinders and injection valves assigned to the cylinders for the purpose of metering fuel, and an exhaust gas tract in which an exhaust gas catalytic converter is disposed. A characteristic variable for an oxygen storage capacity of the exhaust gas catalytic converter is determined. A heating measure for heating the exhaust gas catalytic converter is performed as a function of the characteristic variable.

As a result of the determining of the characteristic variable for the oxygen storage capacity of the exhaust gas catalytic converter, in particular between the starting of the internal combustion engine up to a point in time at which an operational readiness of the exhaust gas catalytic converter has been established, a feedback in respect of the suitable performing of the respective heating measure is made possible and to that extent the respective heating measure can be adapted as requirements dictate.

In this way polluting emissions, in particular those caused by the respective heating measure itself, can be kept at a low level. In the event of no feedback being present, a reserve provision that would possibly be necessary in relation to the respective heating measure in order to ensure that the operational readiness of the exhaust gas catalytic converter is reached can in this respect be chosen so as to be small or can even be omitted entirely. By means of this approach an extremely relevant contribution toward complying with even highly stringent statutory regulations in terms of the permissible polluting emissions of internal combustion engines is possible.

The heating measure can include, for example, the injection of secondary air and/or a suitable ignition angle adjustment and/or a suitable multiple injection.

According to an embodiment the characteristic variable for the oxygen storage capacity is determined as a function of a measurement signal of an exhaust gas probe that is disposed in the exhaust gas catalytic converter or downstream of the exhaust gas catalytic converter in the exhaust gas tract. In this way the characteristic variable can be determined particularly easily and precisely by means of a sensor which is usually present in any case.

According to another embodiment a predetermined air/fuel ratio is subjected to a forced stimulation during a time interval up to the establishing of the operational readiness of the exhaust gas catalytic converter. In this way the characteristic variable for the oxygen storage capacity can be determined particularly easily and precisely.

According to another embodiment the forced stimulation is adjusted in terms of its amplitude as a function of the period of time that has elapsed since a starting of the internal combustion engine. In this way a particularly simple adjustment to the oxygen storage capacity of the exhaust gas catalytic converter which varies in a characteristic manner during the period of time that elapses from the starting of the internal combustion engine is possible and consequently a precise determination of the characteristic value for the oxygen storage capacity is possible.

In this connection it is particularly advantageous if the amplitude is increased as the period of time that has elapsed since the starting of the internal combustion engine increases. In this way allowance can be made for the typically increasing oxygen storage capacity of the exhaust gas catalytic converter from the time of the starting to the point of operational readiness, and on the one hand the characteristic variable for the oxygen storage capacity can be determined particularly precisely and on the other hand unnecessary polluting emissions can be kept at a low level.

According to another embodiment the forced stimulation is adjusted in terms of its amplitude as a function of the characteristic variable for the oxygen storage capacity. In this way the amplitude necessary for precisely determining the characteristic variable for the oxygen storage capacity in the period of time that has elapsed from the starting of the internal combustion engine to the reaching of the operational readiness of the exhaust gas catalytic converter can be adapted particularly accurately to requirements and on an individual basis in relation to the particular internal combustion engine.

In this connection it is particularly advantageous if the amplitude is increased with values of the characteristic variable for the oxygen storage capacity that represent an increasing oxygen storage capacity of the exhaust gas catalytic converter. In this way particularly good account is taken of the real conditions in each case.

According to another embodiment the forced stimulation is adjusted in terms of its frequency as a function of the period of time that has elapsed since a starting of the internal combustion engine. In this way a particularly simple adjustment to the characteristically varying oxygen storage capacity of the exhaust gas catalytic converter during the period of time that has elapsed since the starting of the internal combustion engine is possible and consequently a precise determination of the characteristic value for the oxygen storage capacity is possible.

In this connection it is particularly advantageous if the frequency of the forced stimulation is reduced as the period of time that has elapsed since the starting of the internal combustion engine increases. In this way allowance can be made for the typically increasing oxygen storage capacity of the exhaust gas catalytic converter from the time of starting up to the point of operational readiness, and on the one hand the characteristic variable for the oxygen storage capacity can be determined particularly precisely and on the other hand unnecessary polluting emissions can be kept at a low level.

According to another embodiment a frequency of the forced stimulation is adjusted as a function of the characteristic variable for the oxygen storage capacity. In this way the amplitude necessary for precisely determining the characteristic variable for the oxygen storage capacity in the period of time that has elapsed since the starting of the internal combustion engine to the reaching of the operational readiness of the exhaust gas catalytic converter can be adapted particularly accurately to requirements and on an individual basis in relation to the particular internal combustion engine.

In this connection it is particularly advantageous if the frequency of the forced stimulation is reduced with values of the characteristic variable that represent an increasing oxygen storage capacity of the exhaust gas catalytic converter. In this way particularly good account can be taken of the typically increasing oxygen storage capacity of the exhaust gas catalytic converter as the period of time that has elapsed since the starting of the internal combustion engine increases.

In a further embodiment the characteristic variable for the oxygen storage capacity is determined as a function of a time interval during the individual period of the forced stimulation until a predetermined signal response of the measurement signal of the exhaust gas probe occurs. In this way the characteristic variable can be determined particularly easily, in particular, for example, as a function of the signal response which can be determined by means of experiments or simulations and moreover as a function of the predeterminable signal response of the measurement signal of the exhaust gas probe.

According to another embodiment the characteristic variable for the oxygen storage capacity is determined as a function of the amplitude of the measurement signal of the exhaust gas probe. In this way the characteristic variable for the oxygen storage capacity can be determined particularly easily and precisely.

In this connection it is also possible in principle for the forced stimulation to remain essentially unchanged until the operational readiness of the exhaust gas catalytic converter has been reached. As the oxygen storage capacity increases, the amplitude of the measurement signal of the exhaust gas probe then decreases in a characteristic manner.

According to another embodiment the characteristic variable for the oxygen storage capacity is determined as a function of an integral of the measurement signal of the exhaust gas probe relative to a predetermined measurement signal reference value. The measurement signal reference value can represent, for example, the signal value that is present in the case of a stoichiometric air/fuel ratio of the mixture upstream of the exhaust gas probe prior to its oxidation.

Alternatively or in addition to the amplitude and/or frequency of the forced stimulation it can also be provided that a signal shape of the forced stimulation is adapted in accordance with the procedure in relation to the amplitude. Thus, for example, a triangular or trapezoidal shape, for example, also come into consideration for the signal shape of the forced stimulation in addition to a rectangular shape. In this connection it is also possible to make a modification within the respective shape, e.g. triangular or trapezoidal shape, in accordance with the procedure in relation to the amplitude.

By adjusting one or more variables from the group made up of amplitude, frequency and signal shape it is possible to achieve a particularly targeted adjustment of a charging and discharging of the respective oxygen store of the exhaust gas catalytic converter.

An internal combustion engine (FIG. 1) comprises an intake tract 1, an engine block 2, a cylinder head 3 and an exhaust gas tract 4. The intake tract 4 preferably includes a throttle valve 5, plus a manifold 6 and an intake pipe 7 which is routed toward a cylinder Z1 via an inlet port into the engine block 2. The engine block 2 further comprises a crankshaft 8 which is coupled to a piston 11 of the cylinder Z1 via a connecting rod 10.

The cylinder head comprises a valve train assembly 14, 15 having a gas inlet valve 12 and a gas outlet valve 13.

The cylinder head 3 further comprises an injection valve 18 and an ignition plug 19. Alternatively the injection valve 18 can also be disposed in an intake pipe 7.

Disposed in the exhaust gas tract is an exhaust gas catalytic converter 21 which is embodied as a three-way catalytic converter, for example. Furthermore, in addition or alternatively, an exhaust gas catalytic converter 23, embodied, for example, as a NOX catalytic converter can also be disposed in the exhaust gas tract.

A control device 25 is provided to which are assigned sensors which capture various measured variables and in each case determine the value of the measured variable. Operating variables in addition to the measured variables include values determined as a function of the measured variables. The control device 25 is embodied to determine, as a function of at least one of the operating variables, actuating variables which are then converted into one or more control signals for controlling the actuating elements by means of corresponding actuating drives. The control device can also be designated as a device for operating the internal combustion engine.

The sensors are embodied as a pedal position transducer 26 which detects an accelerator pedal position of the accelerator pedal 27, a mass air sensor 28 which detects a mass air flow upstream of the throttle valve 5, a first temperature sensor 32 which measures an intake air temperature, an intake pipe pressure sensor 34 which measures an intake pipe pressure in the manifold 6, a crankshaft angle sensor 36 which measures a crankshaft angle to which a rotational speed is then assigned, and a second temperature sensor 38 which measures the temperature of a coolant of the internal combustion engine.

Also provided is a first exhaust gas probe 42 which is disposed upstream of the exhaust gas catalytic converter 21 and measures a residual oxygen content of the exhaust gas and whose measurement signal MS1 is characteristic of the air/fuel ratio in the combustion chamber of the cylinder Z1 and upstream of the first exhaust gas probe 42 prior to the oxidation of the fuel, referred to in the following as the air/fuel ratio in the cylinders Z1 to Z4. Also provided is a second exhaust gas probe 43 which is disposed either in the exhaust gas catalytic converter 21 or downstream of the exhaust gas catalytic converter 21 and which measures a residual oxygen content of the exhaust gas and whose measurement signal MS2 is characteristic of the air/fuel ratio in the combustion chamber of the cylinder Z1 and upstream of the second exhaust gas probe 43 prior to the oxidation of the fuel, referred to in the following as the air/fuel ratio downstream of the exhaust gas catalytic converter 21.

The first exhaust gas probe 42 is preferably a linear lambda probe, though it can also be a binary lambda probe. The second exhaust gas probe 43 is preferably a binary lambda probe. It can, however, also be a linear lambda probe.

Depending on embodiment variant, an arbitrary subset of the aforesaid sensors may be present or additional sensors may also be present.

The actuating elements are, for example, the throttle valve 5, the gas inlet and gas outlet valves 12, 13, the injection valve 18 or also the ignition plug 19. Furthermore a secondary air injection having an assigned actuating element can also be provided. In addition to the cylinder Z1 further cylinders Z2 to Z4 are also provided, to which corresponding actuating elements and sensors are then also assigned. Thus, for example, four, six, eight, twelve or even a further arbitrary number of cylinders Z1 to Z4 can be provided.

Programs are stored in a program memory of the control device 25 and can be processed during the operation of the internal combustion engine.

A first program is started in a step S1, in which variables can be initialized if necessary. The start preferably takes place very close in time to a respective start of the internal combustion engine.

In a step S2 a forced stimulation is determined, and moreover with regard to a predetermined air/fuel ratio. In this case one or more parameters of the forced stimulation ZWA are preferably determined in the step, thus, for example, an amplitude A_ZWA of the forced stimulation ZWA and/or a frequency F_ZWA of the forced stimulation ZWA. This means that one parameter or else a plurality of parameters for the forced stimulation can be determined in step S2. The respective forced stimulation parameter can be determined for example as a function of the current period of time T_ST that has elapsed in each case since the respective start of the internal combustion engine and/or a characteristic variable OSC for the oxygen storage capacity of the exhaust gas catalytic converter 21. In this case the calculation rule for determining the amplitude A_ZWA can be provided for example such that the amplitude A_ZWA is increased as the period of time T_ST that has elapsed since the starting of the internal combustion engine increases. Furthermore, alternatively or in addition the calculation rule can also include that the amplitude A_ZWA is increased as the oxygen storage capacity of the exhaust gas catalytic converter 21 increases, which is preferably represented by correspondingly varying values of the characteristic variable OSC for the oxygen storage capacity.

Furthermore, alternatively or in addition the calculation rule of step S2 can also include that the frequency F_ZWA of the forced stimulation ZWA is reduced as the period of time T_ST that has elapsed since the start of the internal combustion engine is increased. Alternatively or in addition the calculation rule of step S2 can also include that the frequency F_ZWA of the forced stimulation ZWA is reduced as a function of the characteristic variable OSC for the oxygen storage capacity as the oxygen storage capacity of the exhaust gas catalytic converter 21 increases. This is performed in particular as a function of the characteristic variable OSC for the oxygen storage capacity.

In a step S3 a setpoint value LAM_SP of the air/fuel ratio is then determined as a function of a predetermined raw setpoint value LAM_SP_RAW of the air/fuel ratio and the forced stimulation ZWA.

Furthermore, one or more actuating elements are then activated for the purpose of setting the setpoint value of the air/fuel ratio LAM_SP, wherein step S3, for example, can also be performed effectively in parallel with the other steps of the first program, and moreover in such a way that step S3 is performed within a predetermined time pattern or else crankshaft angle pattern.

In a step S4 a check is carried out to ascertain whether an operational readiness BB of the exhaust gas catalytic converter 21 has been reached. If this is not the case, processing is resumed, after a predefinable delay where appropriate, at step S2. If, on the other hand, the condition of step S2 is met, the first program is terminated at a step S6.

A second program (FIG. 3) is started in a step S8, in which variables can be initialized if necessary. The second program too is preferably started very close in time to the respective start of the internal combustion engine.

In a step S10 the characteristic variable OSC for the oxygen storage capacity of the exhaust gas catalytic converter 21 is determined. This is carried out for example as a function of a predetermined signal response SIG_REAK of the measurement signal MS2 of the second exhaust gas probe 43, wherein in this connection a time interval T_SIG_REAK during the respective individual period of the forced stimulation ZWA can also be recorded until the predetermined signal response SIG_REAK of the measurement signal MS2 of the second exhaust gas probe 43 occurs.

The predetermined signal response SIG_REAK can represent, for example, a passing through a predetermined signal level of the measurement signal MS2 of the second exhaust gas probe 43. A level of said kind is preferably chosen such that it is characteristic of what is termed a breakthrough reaction of the exhaust gas catalytic converter 21.

The characteristic variable OSC for the oxygen storage capacity can additionally or alternatively be determined also as a function of an amplitude A_MS2 of the measurement signal MS2 of the second exhaust gas probe 43, wherein in this connection preferably the characteristic variable OSC for the oxygen storage capacity is also determined as a function of the correlating amplitude A_ZWA of the forced stimulation in each case and/or of the frequency F_ZWA of the forced stimulation ZWA.

The characteristic variable OSC for the oxygen storage capacity can additionally or alternatively be determined also as a function of an integral of the measurement signal MS2 of the second exhaust gas probe 43 relative to a predetermined measurement signal reference value, wherein in this connection the characteristic variable OSC for the oxygen storage capacity preferably is also determined as a function of the correlating amplitude A_ZWA of the forced stimulation in each case and/or as a function of the frequency F_ZWA of the forced stimulation ZWA.

In this regard, however, the characteristic variable OSC for the oxygen storage capacity can also be determined if necessary independently of the amplitude A_MS2 of the measurement signal MS2 of the second exhaust gas probe 43 as a function of the amplitude A_ZWA of the forced stimulation ZWA and/or of the frequency F_ZWA of the forced stimulation ZWA. In this case one or more engine characteristic maps and also further calculation rules, which where appropriate can also be embodied dynamically, can be present for the purpose of determining the characteristic variable OSC.

At a step S12 a check is carried out to ascertain whether the characteristic variable OSC for the oxygen storage capacity passes a predetermined threshold value THD or has passed said threshold value since the last iteration of step S12. In this case, depending on the embodiment of the characteristic variable OSC for the oxygen storage capacity, an exceeding or, in the other case, undershooting of the threshold value THD can be a determinant for whether the condition of step S12 has been met or not. What is important in this connection is that the condition of step S12 is met when the oxygen storage capacity represented by the characteristic variable OSC is greater than or equal to the oxygen storage capacity represented by the threshold value THD.

If the condition of step S12 is not met, this indicates that the exhaust gas catalytic converter 21 has not yet reached a state of operational readiness BB and a heating measure HM is performed at step S14. The heating measure HM can include a suitable adjustment of the ignition angle with the aim of generating suitably high exhaust gas temperatures, a secondary air injection SAIR and/or a multiple injection M_INJ—all with the purpose of generating suitably high exhaust gas temperatures in the region of the exhaust gas catalytic converter 21 in order specifically to heat the latter.

In this connection, within the framework of the multiple injection, for example, an injection pulse is timed to occur so late during the combustion cycle of the internal combustion engine, relative to the respective cylinder Z1 to Z4, that a predetermined proportion of the fuel reaches the exhaust gas tract 4 still unburnt and in the latter then contributes to the heating up of the exhaust gas catalytic converter 21 by virtue of an exothermic reaction with oxygen.

The heating measure HM can therefore also be performed in an arbitrary combination of the suitable ignition angle ZW and/or the secondary air injection SAIR and/or the multiple injection M_INJ. Preferably the heating measure can also be performed as a function of the characteristic variable OSC determined during the last pass through step S10 in each case and thus adapted to the current level of the conversion capability of the exhaust gas catalytic converter at a given time, to which the characteristic variable OSC for the oxygen storage capacity preferably correlates.

Following step S14 processing is again resumed at step S10, after a predefinable delay where appropriate.

If, on the other hand, the condition of step S12 has been met, the operational readiness BB of the exhaust gas catalytic converter 21 is recognized at a step S16 and subsequent thereto processing is terminated at a step S18.

What is claimed is:

1. A method for controlling the operation of an internal combustion engine having a plurality of cylinders and injection valves assigned to the cylinders for the purpose of metering fuel, and having an exhaust gas tract in which an exhaust gas catalytic converter is disposed, the method comprising:
   (a) determining a value of an oxygen storage capacity variable that indicates an oxygen storage capacity of the exhaust gas catalytic converter using an exhaust gas probe disposed downstream of the exhaust gas catalytic converter in the exhaust gas tract, wherein the current value of the oxygen storage capacity variable indicates operational readiness of the exhaust gas catalytic converter;
   (b) determining whether the value of the oxygen storage capacity variable indicates the exhaust gas catalytic converter has reached full operational readiness after startup,
   (c) adjusting an exhaust temperature by adjusting the operation of the internal combustion engine by subjecting a predetermined air/fuel ratio to a forced stimulation having an amplitude dependent on a time elapsed since a starting of the internal combustion engine, to provide increased heat to the exhaust gas catalytic converter to achieve full operational readiness, and
   repeating steps (a) through (c) until it is determined at step (b) that the value of the oxygen storage capacity variable indicates the exhaust gas catalytic converter has reached full operational readiness after startup, after which time the exhaust temperature adjustment is no longer performed.

2. The method according to claim 1, further comprising determining a value of an oxygen storage capacity variable that indicates the oxygen storage capacity using an exhaust gas probe disposed in the exhaust gas catalytic converter.

3. The method according to claim 1, further comprising adjusting an amplitude of the forced stimulation as a function of the oxygen storage capacity variable that indicates the oxygen storage capacity.

4. The method according to claim 3, further comprising increasing the amplitude of the forced stimulation as values of the oxygen storage capacity variable which represent an increasing oxygen storage capacity of the exhaust gas catalytic converter increase.

5. The method according to claim 1, further comprising adjusting a frequency of the forced stimulation as a function of the period of time that has elapsed since a starting of the internal combustion engine.

6. The method according to claim 5, further comprising reducing a frequency of the forced stimulation as the period of time that has elapsed since the starting of the internal combustion engine increases.

7. The method according to claim 1, further comprising adjusting a frequency of the forced stimulation based at least in part on a function of the oxygen storage capacity variable that indicates the oxygen storage capacity.

8. The method according to claim 7, further comprising reducing the frequency of the forced stimulation as values of the oxygen storage capacity variable which represent an increasing oxygen storage capacity of the exhaust gas catalytic converter increase.

9. The method according to claim 1, further comprising determining the oxygen storage capacity variable that indicates the oxygen storage capacity as a function of a time interval during the individual period of a forced stimulation until a predetermined signal response of the exhaust gas probe occurs.

10. The method according to claim 1, further comprising determining the oxygen storage capacity variable that indicates the oxygen storage capacity as a function of an amplitude of a measurement signal of the exhaust gas probe.

11. The method according to claim 1, further comprising determining the oxygen storage capacity variable that indicates the oxygen storage capacity as a function of an integral of a measurement signal of the exhaust gas probe relative to a predetermined measurement signal reference value.

12. The method according to claim 11, further comprising increasing the amplitude as the period of time that has elapsed since the starting of the internal combustion engine increases.

13. The device according to claim 1, further comprising the control device increasing the amplitude of the forced stimulation as the period of time that has elapsed since the starting of the internal combustion engine increases.

14. The device according to claim 1, further comprising the control device adjusting the amplitude of the forced stimulation as a function of the value of the oxygen storage capacity variable that indicates the oxygen storage capacity.

15. A device for controlling the operation of an internal combustion engine having a plurality of cylinders and injection valves assigned to the cylinders for the purpose of metering fuel, and having an exhaust gas tract in which an exhaust gas catalytic converter is disposed, said device comprising:
   an exhaust gas probe disposed downstream of the exhaust gas catalytic converter in the exhaust gas tract, the exhaust gas probe generating a signal corresponding to a value of an oxygen storage capacity variable that indicates an oxygen storage capacity of the exhaust gas catalytic converter, wherein the current value of the oxygen storage capacity variable indicates operational readiness of the exhaust gas catalytic converter;
   actuating elements comprising at least one of (a) one or more valves or (b) one or more ignition plugs; and
   a control device including program instructions stored in a program memory and configured to:
      determine whether the signal from the exhaust gas probe indicates that the value of the oxygen storage capacity variable indicates the exhaust gas catalytic converter has reached full operational readiness after startup, and adjust an exhaust temperature by adjusting the operation of the internal combustion engine by subjecting a predetermined air/fuel ratio to a forced stimulation having an amplitude dependent on a time elapsed since a starting of the internal combustion engine, to provide increased heat to the exhaust gas catalytic converter to achieve full operational readiness until it is determined that the signal from the exhaust gas probe indicates the value of the oxygen storage capacity variable indicates the exhaust gas catalytic converter has reached full operational readiness after startup, after which time the exhaust temperature adjustment is no longer performed.

16. A method for controlling the operation of an internal combustion engine having a plurality of cylinders and injection valves assigned to the cylinders for the purpose of metering fuel, and having an exhaust gas tract in which an exhaust gas catalytic converter is disposed, the method comprising:

(a) determining a value of an oxygen storage capacity variable that indicates an oxygen storage capacity of the exhaust gas catalytic converter, wherein the current value of the oxygen storage capacity variable indicates operational readiness of the exhaust gas catalytic converter;

(b) determining whether the value of the oxygen storage capacity variable indicates the exhaust gas catalytic converter has reached full operational readiness after startup;

(c) adjusting an exhaust temperature by adjusting the operation of the internal combustion engine by subjecting a predetermined air/fuel ratio to a forced stimulation having an amplitude dependent on a time elapsed since a starting of the internal combustion engine, to provide increased heat to the exhaust gas catalytic converter to achieve full operational readiness; and repeating steps (a) through (c) until it is determined at step (b) that the value of the oxygen storage capacity variable indicates the exhaust gas catalytic converter has reached full operational readiness after startup, after which time the exhaust temperature adjustment is no longer performed;

wherein the oxygen storage capacity variable indicating operational readiness of the exhaust gas catalytic converter corresponds to an air/fuel ratio in the exhaust gas tract downstream of the catalytic converter.

* * * * *